(No Model.)
F. W. CLEGHORN.
PROCESS OF SEPARATING PRECIOUS METALS FROM ORES.
No. 497,014. Patented May 9, 1893.
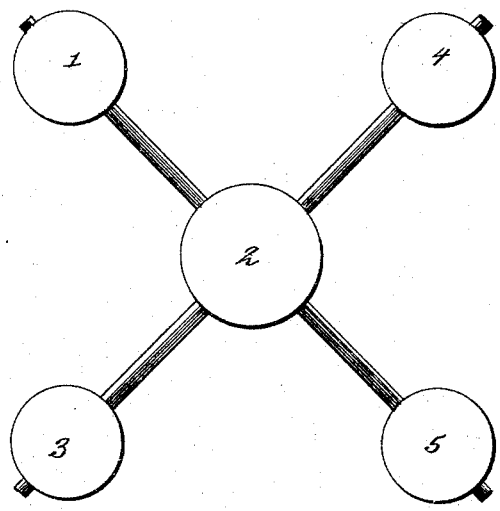
Witnesses:
Inventor
Frederick W. Cleghorn
By James Sheehy
Attorney

UNITED STATES PATENT OFFICE.

FREDERICK W. CLEGHORN, OF SALT LAKE CITY, UTAH TERRITORY, ASSIGNOR TO CHARLES G. BROWN, OF SAME PLACE.

PROCESS OF SEPARATING PRECIOUS METALS FROM ORES.

SPECIFICATION forming part of Letters Patent No. 497,014, dated May 9, 1893.

Application filed April 25, 1892. Serial No. 430,517. (No specimens.)

*To all whom it may concern:*

Be it known that I, FREDERICK W. CLEGHORN, a citizen of the United States, residing at Salt Lake City, in the county of Salt Lake and Territory of Utah, have invented certain new and useful Improvements in Processes of Separating Precious Metals from Ores; and I do declare the following to be a full, clear, and exact description of the invention, such as will enable others skilled in the art to which it appertains to make and use the same.

My invention relates to a process of separating precious metals, such as gold and silver, from their ores, and the novelty will be fully understood from the following description when taken in connection with the claims appended.

For the better understanding of my invention I will describe the same in conjunction with the accompanying drawing in which is illustrated in plan a plant or apparatus for carrying out my invention.

Referring to the said drawing:—the reference numeral 1, indicates a tank or receptacle in which the solution of hyposulphite of soda and sulphuric acid is stored.

2, indicates the tank in which the ores to be treated are contained.

3, indicates the tank into which the precious metals and metals in the solution are drawn from the tank 1, and in which tank (3) the precious metals are precipitated.

4, indicates the tank or receptacle containing the solution of sulphuric acid or muriatic acid and salt; and 5, indicates the tank into which the solution from tank 4, viz:—the solution of sulphuric acid or muriatic acid and salt is drawn after being filtered through tank 2, and in which tank (5) the precious metals are precipitated by means of an agent such as metallic iron, metallic zinc, or metallic copper (as required) and electrolysis.

In carrying out my invention the ore is first pulverized and screened through a screen (preferably No. 10) and is placed in the ore tank 2, where it is saturated with the solution consisting of hyposulphite of soda, and sulphuric acid, which are drawn from the tank 1; and decomposition is aided by means of heat which may be applied by means of steam or otherwise. The purpose of the sulphuric acid in the hyposulphite solution, is to neutralize the impurities which collect in the solution and interfere with the action of the same upon the ore. After the ore in the tank 2 has been thoroughly saturated, the solution is drawn off into the tank 3, and the gold, silver, and other metals are there precipitated by means of sulphide of calcium or soda, the latter being prreferable. This sulphide of calcium or sodium, forms sulphides of the precious metals and the precipitate thus formed is removed in any convenient manner and is dried, roasted for the removal of sulphur and is left in condition for reduction by cupellation or otherwise.

The ore remaining in the tank 2, may still contain a certain percent. of precious metals especially where sulphides exist, and in order to extract all of such precious metals, I first mash the ore remaining in tank 2, after the first treatment and then saturate such ore in the tank 2, with a solution drawn from tank 4, viz:—sulphuric acid or muriatic acid and salt. I then draw this solution from the tank 2, into the tank 5, and in such tank 5, I precipitate the precious metals which are suspended in the solution in the state of chlorides by placing metallic iron or its equivalent in the filtrate and passing an electric current through the same. After precipitation has taken place in the tanks 3, and 5, I draw the solution from the said tank and return it to the tank 4, for further use.

In the practice of my invention it is obvious that the proportions of the elements making up the solutions are varied in accordance with the character of the ore to be treated.

Having described my invention, what I claim is—

1. The process herein described of separating gold and silver from ores, the same consisting in filtering through the ores a solution of sulphuric acid and salt, and precipitating the gold and silver in the filtrate solution by placing metallic iron in the filtrate and passing an electric current through the filtrate, substantially as specified.

2. The process herein described of separating gold and silver from ores, consisting in subjecting the ores to the action of a solution of hyposulphite of soda and sulphuric acid, then precipitating the gold and silver in the filtrate by means of sulphide of calcium or sodium, then subjecting the ore that has been treated with the solution of hyposulphite of soda and sulphuric acid, to a solution of sulphuric acid and salt, and precipitating the gold and silver in the solution of sulphuric acid and salt by placing metallic iron in the filtrate and passing an electric current through the filtrate, substantially as specified.

In testimony whereof I affix my signature in presence of two witnesses.

FREDERICK W. CLEGHORN.

Witnesses:
E. W. TAYLOR,
L. LODER.